(No Model.)
C. A. HIGBEE, J. BRAUN & H. DECK.
TOOL FOR CUTTING DOWN SCREW THREADS.
No. 501,943. Patented July 25, 1893.
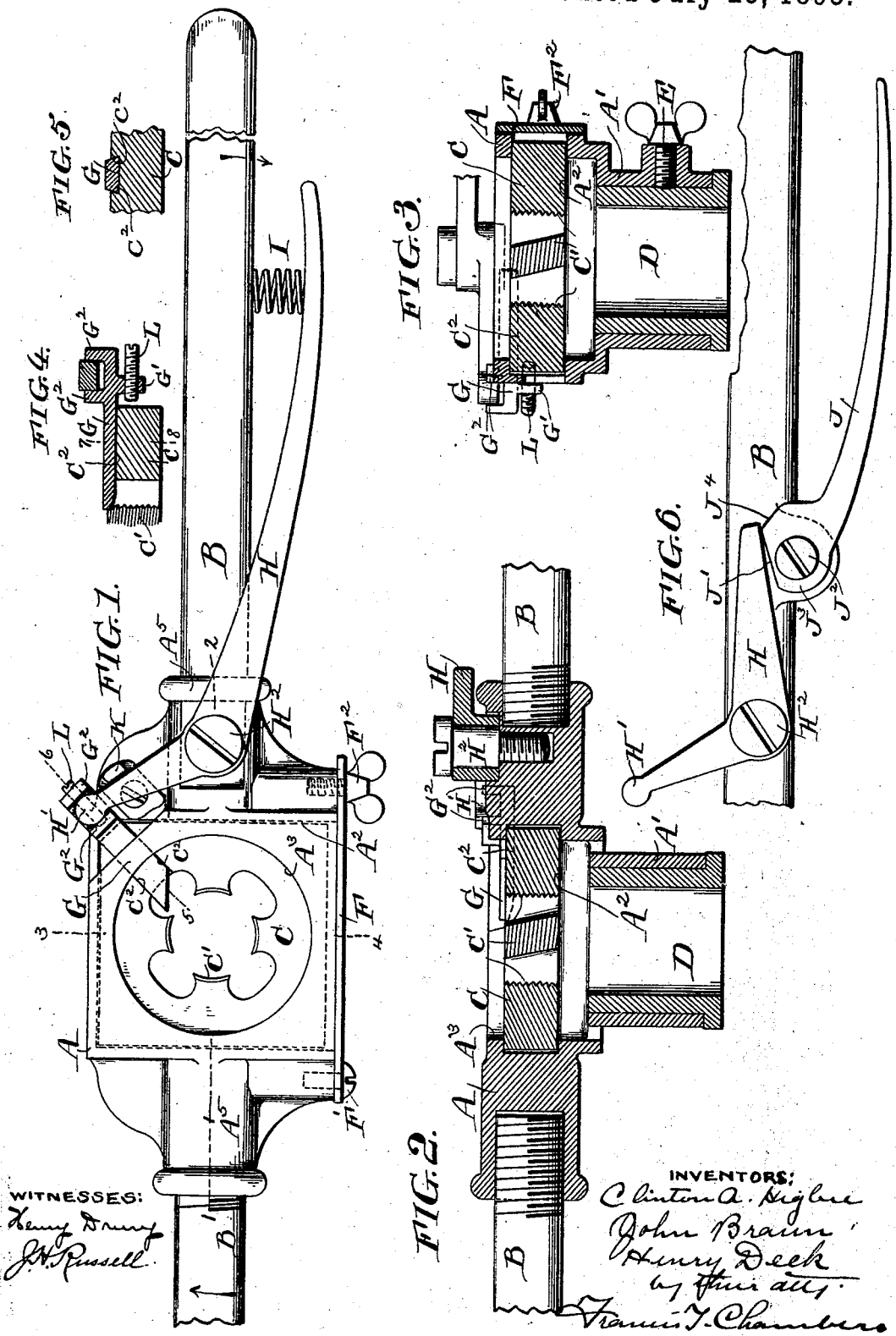
WITNESSES:
INVENTORS:
Clinton A. Higbee
John Braun
Henry Deck
by their atty.
Francis T. Chambers

UNITED STATES PATENT OFFICE.

CLINTON A. HIGBEE, JOHN BRAUN, AND HENRY DECK, OF PHILADELPHIA, PENNSYLVANIA, ASSIGNORS TO SAID HIGBEE AND JOHN BRAUN & SONS, OF SAME PLACE.

TOOL FOR CUTTING DOWN SCREW-THREADS.

SPECIFICATION forming part of Letters Patent No. 501,943, dated July 25, 1893.

Application filed June 20, 1892. Serial No. 437,250. (No model.)

*To all whom it may concern:*

Be it known that we, CLINTON A. HIGBEE, JOHN BRAUN, and HENRY DECK, all of the city and county of Philadelphia, State of Pennsylvania, have invented a new and useful Tool for Cutting Down Screw-Threads, of which the following is a true and exact description, reference being had to the accompanying drawings, forming part of this specification.

Our invention relates to the construction of tools for cutting down the threads of screws and bolts so as to form screws such as are described in the patent to Clinton A. Higbee, No. 447,775, of March 10, 1891. Tools for this purpose have been devised by the said Clinton A. Higbee, and our invention is an improvement on the tool devised by the said Higbee and described in his application for Letters Patent filed June 20, 1892.

The object of our invention is to secure the proper adjustment and operation of the cutting tool with respect to the die, and the device being particularly adapted for use in that class of tools chiefly used by plumbers in which the die is loosely held in the holder by which it is actuated.

The nature of our improvement will be best understood as described in connection with the drawings in which it is illustrated, and in which—

Figure 1 is a plan view of the tool; Fig. 2 a longitudinal section on the line 1—2 of Fig. 1; Fig. 3 a cross-section on the line 3—4 of Fig. 1; Fig. 4 a section on the line 5—6 of Fig. 1; Fig. 5 a section on the line 7—8 of Fig. 4, and Fig. 6 a view illustrating a modification of the tool actuating device.

A is a holder formed with a cavity adapted to receive the die C. The box-like cavity is open at one side for the insertion and removal of the die, and this opening as shown is closed by a plate F pivoted on a screw F' and adapted to be secured in place across the opening by means of a thumb-screw $F^2$. An opening preferably circular as indicated at $A^3$ is formed in the upper face of the holder exposed to the die to permit the rod or pipe to pass through, while on the opposite or lower side a similar opening is formed surrounded by an annular sleeve A'; this sleeve serving to support a removable guide sleeve or lining D which is secured in place by a thumb-screw E (see Fig. 2).

At each side of the holder A sockets $A^5$ are provided and receive handles B B as shown.

C, as before stated, is the die which as shown in the drawings is provided with cutting faces C' such as are used for cutting threads on pipes and rods.

In the upper face of the die is formed a recess or slide $C^2$ which may be made in any convenient way to serve as a guide for the cutting tool G the edge of which is adapted to project inward, and formed so that its cutting action will be brought into play when the die is reversed so as to unscrew it from the threaded bolt or pipe end upon which it has been secured or which it has been used to form.

L is an adjustable stop secured to a lug G' extending from the back of the cutting tool G, and so placed that it will come in contact with a portion of the die C.

$G^2$ $G^2$ are lugs extending upward from the face of the cutting tool so as to embrace the end H' of a pivoted lever H H', the pivot pin $H^2$ of which is secured into the socket as shown.

I, Fig. 1, is a spring acting against the end H of the lever pressing it out from handle B so that the end H' will rest against the stop K and the tool G be drawn back so that its edge will not project into the cavity of the die.

In Fig. 6 I have shown the arm H of the lever H H' shortened and arranged at a somewhat different angle from the similar arm in Fig. 1, and have provided a lever J pivoted at $J^2$ and having a cam shaped head $J^3$ which rests against the arm H, and is preferably provided with a flattened portion J' which rests against the arm H when the tool is withdrawn from operative position and a flanged portion $J^4$ which rests against the arm H and locks it in position when the lever J is drawn in toward the handle B to which it is attached.

The operation of the device is simple and it is used in the ordinary way of a stock to cut a thread on a pipe or rod which is introduced through a sleeve D, the tool being turned in the direction of the arrows in Fig. 1, until the pipe or rod is threaded for the desired distance, and then the direction of the turning reversed to unscrew it. At the point from which it is desired to cut away the thread the tool G is thrust forward by moving the lever H H' either directly as indicated in Fig. 1 or by means of the lever J as indicated in Fig. 6. The distance to which the tool is forced in is regulated by the adjustable stop L which comes in contact with the side of the die C and prevents further forward motion of the cutting tool. The tool is held in operative position in which it entirely cuts away the thread until the top of the rod or pipe is passed below it. By securing the cutting tool on guides directly upon the die C and having the stop which regulates its motion act against the side of the die we insure absolute accuracy in the operation of the cutting tool and are enabled to use it with stocks having loose dies such as are ordinarily used for the purpose of cutting threads on pipes.

Having now described our invention, what we claim as new, and desire to secure by Letters Patent, is—

1. The combination of a die C, a holder A in which the die is removably held, a longitudinally movable cutting tool G secured in guides directly to the die C and means for moving said tool so as to force it toward or from the die cavity substantially as specified.

2. The combination of a die C, a holder A in which the die is removably held, a cutting tool G secured in guides directly to the die C, a stop L secured to the cutting tool and arranged to abut against the die C and means for actuating said tool substantially as specified.

3. The combination of the die C, a holder A in which the die is removably held, a cutting tool G secured in guides directly to the die C and an actuating lever pivoted to the holder and in engagement with the cutting tool.

4. The combination of the die C, a holder A in which the die is removably held, a cutting tool G secured in guides directly to the die C and an actuating lever H H' pivoted to the holder and in engagement with the cutting tool at one end and a cam lever J also pivoted to the holder and arranged to act on the free end of the lever H H' as described.

CLINTON A. HIGBEE.
JOHN BRAUN.
HENRY DECK.

Witnesses:
FRANK CRAVEN,
CHARLES R. HARRIS.